United States Patent
Bunce et al.

(10) Patent No.: US 11,406,112 B2
(45) Date of Patent: Aug. 9, 2022

(54) LIQUID COCONUT-BASED COFFEE CREAMER AND METHOD OF MAKING THE SAME

(71) Applicant: NESTEC S.A., Vevey (CH)

(72) Inventors: Matthew Galen Bunce, Glen Burnie, MD (US); Maxime Saffon, Hilliard, OH (US); Jun-Tse Fu, Dublin, OH (US); Alexander Sher, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 711 days.

(21) Appl. No.: 16/308,998

(22) PCT Filed: Jun. 13, 2017

(86) PCT No.: PCT/EP2017/064459
§ 371 (c)(1),
(2) Date: Dec. 11, 2018

(87) PCT Pub. No.: WO2017/216194
PCT Pub. Date: Dec. 21, 2017

(65) Prior Publication Data
US 2019/0307143 A1    Oct. 10, 2019

Related U.S. Application Data

(60) Provisional application No. 62/411,944, filed on Oct. 24, 2016, provisional application No. 62/350,138, filed on Jun. 14, 2016.

(51) Int. Cl.
| | | |
|---|---|---|
| *A23C 11/10* | (2021.01) | |
| *A23C 11/06* | (2006.01) | |
| *A23J 1/14* | (2006.01) | |
| *A23L 3/16* | (2006.01) | |

(52) U.S. Cl.
CPC ............ *A23C 11/103* (2013.01); *A23C 11/06* (2013.01); *A23J 1/148* (2013.01); *A23L 3/16* (2013.01); *A23V 2002/00* (2013.01)

(58) Field of Classification Search
CPC ........ A23V 2002/00; A23V 2250/5054; A23V 2250/548; A23V 2250/5022; A23L 29/272; A23L 2/52; A23L 2/60; A23L 33/185; A23L 2/66; A23L 9/20; A23C 11/103; A23C 11/06; A23C 9/156; A23C 13/12; A23C 13/14; A23C 20/005; A23C 9/137; A23C 9/1315
See application file for complete search history.

(56) References Cited

U.S. PATENT DOCUMENTS

| | | | |
|---|---|---|---|
| 10,645,958 B2 * | 5/2020 | Reh | ................... A23F 5/465 |
| 2004/0062846 A1 | 4/2004 | Sargent et al. | |
| 2016/0050950 A1 | 2/2016 | Schmitt et al. | |
| 2016/0081378 A1 * | 3/2016 | Madsen | ............... A23L 29/272 426/564 |

FOREIGN PATENT DOCUMENTS

| | | | | |
|---|---|---|---|---|
| CN | 101557718 A | 10/2009 | | |
| JP | H10234316 A | 9/1998 | | |
| WO | 2011129251 A1 | 10/2011 | | |
| WO | 2013078510 | 6/2013 | | |
| WO | WO-2014184134 A1 * | 11/2014 | ............... | A23L 9/20 |
| WO | WO-2016102313 A1 * | 6/2016 | ............. | A23L 27/10 |

OTHER PUBLICATIONS

Mintel "Barista Style French Vanilla Coconut Milk Creamer" Apr. 2013, Database accession No. 2017452, 3 pages, XP002771810.
Mintel "French Vanilla Coconut Milk Coffee Creamer" May 2016, Database accession No. 3982597, 4 pages, XP002771808.
Chinese Office Action for Appl No. 201780034918 dated Nov. 11, 2021.

* cited by examiner

*Primary Examiner* — Hong T Yoo
(74) *Attorney, Agent, or Firm* — K&L Gates LLP

(57) ABSTRACT

The present invention relates to beverage products, in particular a liquid natural coconut based creamer composition comprising: coconut; coconut oil; high acyl gellan gum present in an amount ranging from 0.08 to 0.15 wt/wt %; guar gum present in an amount ranging from 0 to 0.5 wt/wt %; pea protein present in an amount ranging from 0.2 to 2 wt/wt %; and buffer.

9 Claims, 1 Drawing Sheet

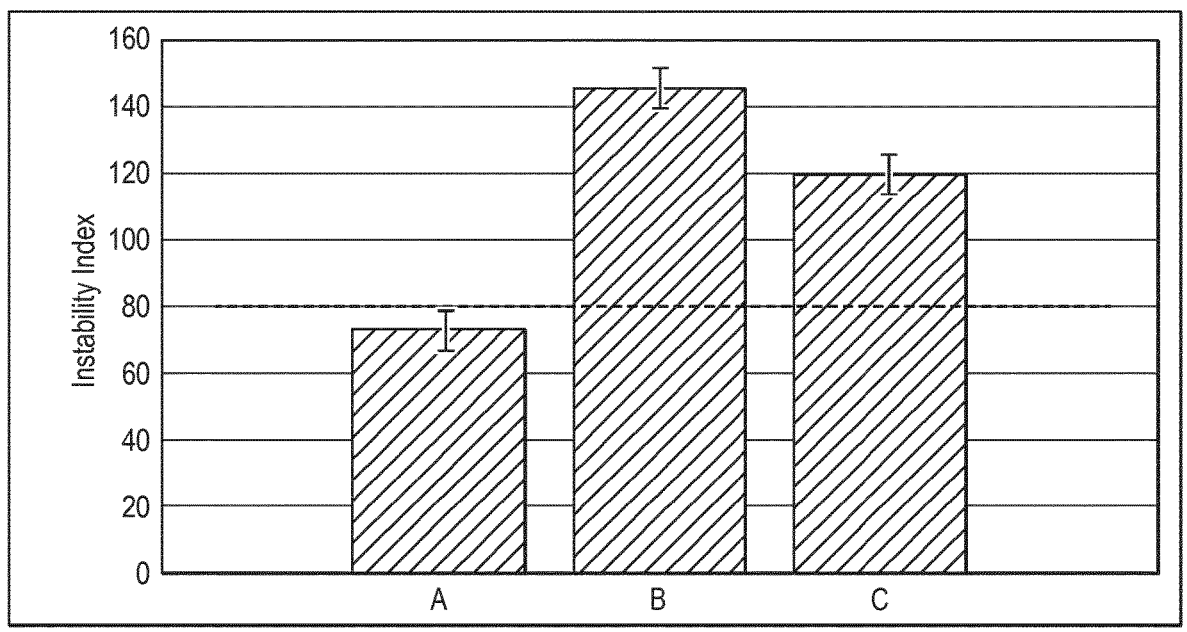

LIQUID COCONUT-BASED COFFEE CREAMER AND METHOD OF MAKING THE SAME

CROSS REFERENCE TO RELATED APPLICATIONS

The present application is a National Stage of International Application No. PCT/EP2017/064459, filed on Jun. 13, 2017, which claims priority to U.S. Provisional Patent Application No. 62/350,138, filed on Jun. 14, 2016, and U.S. Provisional Patent Application No. 62/411,944, filed on Oct. 24, 2016, the entire contents of which are being incorporated herein by reference.

FIELD OF THE INVENTION

The present invention relates to liquid creamers and the method to produce the same. More specifically, the present disclosure is directed to creamers with natural hydrocolloids. Such creamer provides indulgent texture and mouthfeel when added to beverages such coffee or tea.

BACKGROUND OF THE INVENTION

Creamers are widely used as whitening agents with hot and cold beverages such as, for example, coffee, cocoa, tea, etc. They are commonly used in place of milk and/or dairy cream.

Recent trends indicate that more and more consumers are seeking for dairy alternatives. For example, consumers consider plant-based creamers to whiten their cup. One drawback to consider while developing such creamers is that plant proteins often tend to give an off-flavor to the final beverage constituting the creamer.

Creamers may come in a variety of different flavors and provide mouthfeel, body, and a smoother texture. Creamers can be in liquid or powder forms. A liquid creamer may be intended for storage at ambient temperatures or under refrigeration, and should be stable during storage without phase separation, creaming, gelation and sedimentation. The creamer should also retain a constant viscosity over time. When added to cold or hot beverages such a coffee or tea, the creamer should dissolve rapidly, provide a good whitening capacity, and remain stable with no feathering and/or sedimentation while providing a superior taste and mouthfeel. Mouthfeel, also denoted richness, texture or creaminess, is usually provided by the oil emulsion present in the creamer.

Thus, it is critical not only to enhance texture/mouthfeel of coffee with creamers but also to have stable liquid coffee creamers as is without compromising creamer stability over shelf life (at least 6 months at refrigeration and ambient temperatures for aseptic products).

All previous attempts to create plant-based liquid creamers have the following drawbacks:

High viscosity of liquid creamers resulted in poor pourability from the bottle

Dripping-back liquid stream during pouring

Phase separation (gelation, serum formation) during shelf life

The present invention allows to solve the following problems:

poor emulsion stability of the Extended Shelf Life (ESL) creamers over shelf life (>5 months, refrigeration), poor sensory characteristics of plant-based creamers (e.g. smoothness, body, bitterness, oxidized flavors)

Other solutions to stabilize emulsion in liquid creamers are:

For example, sodium caseinate used in creamers today is not plant-based and cannot be considered as a natural ingredient. Similarly, mono or di glycerides as well as DATEM (diacetyl tartaric acid ester of mono- and diglycerides) are synthetic and are not considered as natural ingredients.

Thus, there are no solutions available for natural, stable liquid plant-based creamer The present invention relates to non-dairy ESL aseptically packaged liquid creamers comprising natural stabilizing systems, and to the process of making thereof.

SUMMARY OF THE INVENTION

In one aspect, the present invention relates to a liquid natural coconut creamer composition comprising:

A coconut; high acyl gellan gum present in an amount ranging from 0.08 to 0.15 wt/wt %; guar gum present in an amount ranging from 0 to 0.5 wt/wt %; pea protein present in an amount ranging from 0.2 to 2 wt/wt %; and buffer. In one embodiment of the present invention, pea protein comprises protein extracted from pea flour, for example yellow pea (*Pisum sativum*) using isoelectric precipitation. In another embodiment of the present invention, pea protein is separated from the pea flour using enzymatic process for example alpha amylases for starch hydrolysis.

In another embodiment of the present invention, yellow peas (*Pisum sativum*), are roasted between 110 and 160° C. between 1 and 5 minutes prior extraction from the pea flour using isoelectric precipitation and/or enzymatic process.

In one embodiment of the present invention, the creamer further comprises acacia Senegal gum present in an amount ranging from 0 to 1.0 wt/wt %;

In another embodiment of the present invention, the creamer further comprises guar gum present in an amount ranging from 0 to 0.5 wt/wt %;

In another aspect, the present invention relates to the composition described above, wherein the coconut is in an edible form of a paste or a powder and does not contain stabilizers or additives.

In one embodiment, the creamer of the present composition further includes a pH buffer comprising sodium bicarbonate ranging from 0.10 to 0.40 wt/wt % of the creamer composition.

In another aspect, the present invention relates to the composition described above, wherein D[4,3] particle size of creamer ranging from 0.5 to 5 microns.

The creamers are easily dispersible in coffee, stable in hot and cold acidic environment, without feathering, breaking emulsion, de-oiling, flocculation, and sedimentation. When added to coffee or tea or other liquid products, the creamers provide improved mouthfeel, full body, smooth texture, and also a good flavor with no off-flavor notes developed during storage.

Advantageously and unexpectedly, a unique combination of hydrocolloids and pea proteins provided physical and chemical stability to the creamers, preferred texture/mouthfeel/smoothness, and pleasant taste when added in coffee. In addition, the creamers have a good physico-chemical stability during shelf life.

The ESL creamers are stable at refrigeration for at least 5 months.

Though the present invention discloses the coffee creamers, use of the creamers, it is not limited for only coffee applications. For example, the creamers can be also used for other beverages, such as tea or cocoa, or used with cereals or berries, creamers for soups, in many cooking applications.

The products of the invention present excellent organoleptic properties, in particular in terms of texture and mouthfeel even when very low levels of fat are used. Besides, the products of the invention show good stability and can therefore advantageously allow avoiding the use of non-natural additives.

Another aspect of the present invention relates to a process of preparing the creamer composition comprising:
dissolving the ingredients in hot water under agitation;
sterilizing the composition using ultra-high temperature (UHT) treatment;
homogenizing the composition at temperature ranging from 70-85° C.; wherein homogenization performed before UHT treatment, after UHT treatment, or before and after UHT treatment; and
cooling and filing the creamer under aseptic conditions.

BRIEF DESCRIPTION OF THE FIGURES

FIG. 1 shows Instability Index of the liquid creamers (A, B, and C represents Examples 1, 2, and 3 respectively).

DETAILED DESCRIPTION OF THE INVENTION

Further in the present context unless indicated otherwise % of a component means the % of weight based on the weight of the creamer composition, i.e. weight/weight %

In one embodiment of the present invention, the creamer further comprises of vegetable oils ranges from 0 to 10 wt/wt % of the creamer composition.

For the best mouthfeel, and physic-chemical properties as such and when added to hot coffee, the creamer composition comprises between about 0% and about 11% oil. Preferably, the unsaturated oil comprises a vegetable oil selected from the group consisting of high oleic canola, high oleic soybean, high oleic sunflower, high oleic safflower, or a highly saturated oil such as coconut oil or a combination thereof.

In another embodiment of the present invention, the creamer comprises of sugar comprising sucrose, glucose, fructose, contained in cane sugar, beet sugar, molasses and/or combinations ranging from 5 to 30% of the creamer composition. Non-limiting examples of the sugar source include beets, canes, honey, molasses, agave syrup, maple syrup, malt, rice, oat, pea, corn, tapioca, potato sugar, cane juice, yacon syrup or a combination thereof.

In another embodiment of the present invention, the creamer comprises a sweetener in an amount of 0 to about 10% by weight of the composition. By "sweetener" it is to be understood a mixture of ingredients which imparts sweetness to the final product. These include natural plant derived nutritive and non-nutritive sweeteners such as stevia or monk fruit.

In one embodiment of the present invention, the creamer comprises oil-in-water emulsion.

A beverage composition comprises the creamer as described in the present invention wherein the beverage is a coffee beverage, a cocoa or chocolate beverage, a malted beverage, and/or ready-to-drink beverage.

A beverage according to the invention comprises the creamer as described in the present invention and may e.g. be in the form of liquid or liquid concentrate to be mixed with a suitable liquid, e.g. water or milk, before consumption, or a ready-to-drink beverage. By a ready-to-drink beverage is meant a beverage in liquid form ready to be consumed without further addition of liquid.

The Lumisizer (LUM, Germany) Model 611 was used to evaluate the stability against creaming. Lumisizer (LUM, Germany), is an instrument using light scattering detection under sample centrifugation. It is especially designed to assess different separation phenomena based on oil droplet creaming or particle sedimentation occurring in oil-in-water emulsions and dispersions. In the Lumisizer, the so-called STEP technology (Step and Time resolved Extinction Profiles) is used. The samples were measured without dilution and centrifugal forces were exerted up to 2 hours at 20° C. and 2300 g force. The transmission profiles of samples were taken every 20 sec.

From the raw transmission profiles, the integral of transmission over time is calculated and its slope (named an Instability Index) was used as a quantitative measure for emulsion instability against creaming. Separation graphs shows movements of the interface between the dispersed phase, i.e. the movement of emulsion layers, and the clear phase, as a function of time.

The difference is separation rates (Instability Index) between the samples allowed to assess relative stability of emulsions against creaming. The integral transmission (T) was plotted as a function of time (t), and the slope ($\Delta T/\Delta t$) was calculated. A higher slope (Instability Index) indicates a faster separation and thus a less stable product.

The size of particles, expressed in microns for volume mean diameter D[4,3] of the cumulative distribution measured using Malvern Mastersizer 3000 (laser diffraction unit). Ultra-pure and gas free water was prepared using Honywell water pressure reducer (maximum deionized water pressure: 1 bar) and ERMA water degasser (to reduce the dissolved air in the deionized water).

In one embodiment of the present invention, the mean D[4,3] particle size of creamer ranges from 0.5 to 5 microns.

A ready-to-drink beverage of the present invention may be subjected to a heat treatment to increase the shelf life of the product, e.g. by retorting, UHT (Ultra High Temperature) treatment, HTST (High Temperature Short Time) pasteurization, batch pasteurization, or hot fill.

The product may additionally comprise of natural flavors and/or natural colorants. These are used in conventional amounts which can be optimized by routine testing for any particular product formulation.

EXAMPLES

Example 1

Liquid Creamers were Produced as Below.
A dry blend of sugar, sodium bicarbonate, high acyl gellan gum, yellow pea protein, sea salt, natural flavors was prepared by mixing together 22.5 kg of sucrose with 0.25 kg of sodium bicarbonate, 0.09 kg of high acyl gellan, 0.09 kg of guar gum, 0.5 kg of pea protein produced by isoelectric precipitation from yellow pea flour, 0.2 kg of natural flavors. The dry blend was added into 50 kg of hot water (~75° C.) under high agitation.

Next, and after 5 minutes of mixing under continuous high agitation, 10 kg of coconut (in form for cream) were added into the tank under high agitation. After 5 minutes, 3.0 kg of coconut oil were added and mixed for 5 minutes. Additional water was added to adjust the total amount to 100 kg.

The liquid creamer was pre-homogenized at 130/30, pre-heated, UHT treated for 12 sec at 136° C., homogenized at 130/30 bar and cooled. The liquid creamer was aseptically filled into bottles. The resultant liquid creamer can be aseptically filled in any aseptic containers such as, for example, jars, jugs, or pouches. The liquid creamer was stored 5 month at 4° C.

The physic-chemical stability and sensory of creamer and coffee beverages with added liquid creamer were judged by trained panellists. No phase separation (creaming, de-oiling, marbling, etc.), gelation, and practically no viscosity changes were found during the storage.

It was surprisingly found that the liquid creamer has good appearance, mouth-feel, smooth texture and a good flavour without "off" taste. In addition, the creamer showed high whitening capacity when added to a coffee.

Example 2

A liquid creamer was prepared as in Example 1 but using 0.09 kg of high acyl gellan, 0.4 kg of pea protein produced by isoelectric precipitation from yellow pea flour, and 12 kg of coconut cream. The physico-chemical stability and sensory of liquid creamer and coffee beverages with added liquid creamer were judge by trained panellists. After 1-month storage at 4° C., the sensory evaluation showed unacceptable phase separation (syneresis, creaming).

Example 3

A liquid creamer was prepared as in Example 1 but using 1.5 kg of high acyl gellan, 0.4 kg of dipotassium phosphate, 25 kg of sugar, and 17 kg of coconut cream. The physico-chemical stability and sensory of creamer and coffee beverages with added liquid creamer were judged by trained panellists. No phase separation (for example creaming, de-oiling and/or marbling), gelation, and practically no viscosity changes were found during the storage.

The invention claimed is:

1. A creamer composition which is liquid natural coconut-based, the creamer composition comprising:
    coconut cream;
    high acyl gellan gum present in an amount ranging from 0.08 to 0.15 wt/wt % of the creamer composition;
    pea protein present in an amount ranging from 0.2 to 2.0 wt/wt % of the creamer composition; and
    a buffer,
    wherein the creamer composition has a formulation selected from the group consisting of (i) guar gum is absent and (ii) guar gum is present in an amount up to 0.5 w/w % of the creamer composition.

2. The creamer composition of claim 1, wherein the coconut cream is in the form of a paste.

3. The creamer composition of claim 1, wherein the creamer composition further comprises acacia gum.

4. The creamer composition of claim 1, wherein the creamer composition further comprises vegetable oils.

5. The creamer composition of claim 4, wherein the vegetable oils comprises a vegetable oil selected from the group consisting of coconut oil, high oleic canola oil, high oleic soybean oil, high oleic sunflower oil, high oleic safflower oil and combinations thereof.

6. The creamer composition of claim 1, wherein the creamer composition further comprises sugar ranging from 5-30 wt/wt % of the creamer composition.

7. The creamer composition of claim 1, wherein the creamer composition further comprises a natural sweetener in an amount of about 0.0003% to about 10% by wt/wt % of the creamer composition.

8. The creamer composition of claim 1, wherein the buffer comprises a pH buffer comprising sodium bicarbonate ranging from 0.1 to 0.4 wt/wt % of the creamer composition.

9. The creamer composition of claim 1, wherein a mean D[4,3] particle size of the creamer composition ranges from 0.5 to 5.0 microns.

* * * * *